United States Patent
Kondo et al.

(10) Patent No.: US 6,297,855 B1
(45) Date of Patent: Oct. 2, 2001

(54) SIGNAL CONVERSION APPARATUS AND METHOD

(75) Inventors: Tetsujiro Kondo, Tokyo; Naoki Kobayashi; Hideo Nakaya, both of Kanagawa; Takaya Hoshino, Saitama; Takeharu Nishikata, Chiba, all of (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/218,527

(22) Filed: Dec. 22, 1998

(30) Foreign Application Priority Data

Dec. 25, 1997 (JP) .................................................. 9-357621

(51) Int. Cl.$^7$ ................. H04N 7/01; H04N 9/67; H04N 11/20

(52) U.S. Cl. .................... 348/663; 348/441; 348/453; 348/659; 348/660; 348/661

(58) Field of Search .................. 348/441, 453, 348/659, 660, 661, 663; 345/154; H04N 7/01, 11/20, 9/67

(56) References Cited

U.S. PATENT DOCUMENTS

| | | | |
|---|---|---|---|
| 5,049,990 | 9/1991 | Kondo et al. | 358/133 |
| 5,124,688 | * 6/1992 | Runball | 358/23 |
| 5,532,749 | * 7/1996 | Hong | 348/441 |
| 5,666,164 | * 9/1997 | Kondo et al. | 348/441 |
| 5,703,621 | 12/1997 | Kondo | 348/409 |
| 5,767,986 | 6/1998 | Kondo | 348/394 |
| 5,808,688 | * 9/1998 | Sung | 348/441 |
| 5,831,687 | * 11/1998 | Hirano et al. | 345/154 |
| 5,884,618 | * 12/1998 | Horiike et al. | 348/441 |
| 5,999,164 | * 12/1999 | Ito | 348/661 |
| 6,107,987 | * 8/2000 | Coelho | 345/154 |

FOREIGN PATENT DOCUMENTS

| | | |
|---|---|---|
| 07-099666 | 4/1995 | (JP) . |
| 07-250344 | 9/1995 | (JP) . |
| 07-288842 | 10/1995 | (JP) . |
| 10-013856 | 1/1998 | (JP) . |
| 10-066031 | 3/1998 | (JP) . |
| 10-084559 | 3/1998 | (JP) . |
| 10-150674 | 6/1998 | (JP) . |

OTHER PUBLICATIONS

Patent Abstract Of Japan, vol. 95, No. 11, Dec. 26, 1995 & JP 07 212794 A (Sony Corp), Aug. 11, 1995.
Patent Abstract Of Japan, vol. 96, No. 2, Feb. 29, 1996 & JP 07 288842, Oct. 31, 1995.
Patent Abstract Of Japan, vol. 96, No. 1., Jan. 31, 1996 & JP 07 250344 A (Sony Corp), Sep. 26, 1995.
Patent Abstract Of Japan, vol. 95, No. 7, Aug. 31, 1995 & JP 07 099666 A (Sony Corp), Apr. 11, 1995.

* cited by examiner

*Primary Examiner*—Reinhard J. Eisenzopf
*Assistant Examiner*—Brian P. Yenke
(74) *Attorney, Agent, or Firm*—Frommer Lawrence & Haug LLP; William S. Frommer; Gordon Kessler

(57) ABSTRACT

A simplified Y/C separation circuit in which, a plurality of luminance signals are calculated for the subject pixel based on an NTSC signal of the subject pixel and NTSC signals of pixels that are close to the subject pixel spatially or temporally. Correlations between the plurality of luminance signals are obtained in a difference circuit and a comparison circuit. In a classification circuit, classification is performed, that is, the subject pixel is classified as belonging to a certain class, based on the correlations between the plurality of luminance signals. Prediction coefficients corresponding to the class of the subject pixel are read out from a prediction coefficients memory section. The RGB luminance signals of the subject pixel are then determined by calculating prescribed linear first-order formulae.

26 Claims, 9 Drawing Sheets

SUBJECT FIELD

SUBJECT PIXEL $Y_1 = 0.5P_1 + 0.25P_2 + 0.25P_2$

SUBJECT PIXEL

SUBJECT FIELD $Y_2 = 0.5P_1 + 0.25P_2 + 0.25P_3$

2-FIELD PRECEDING FIELD $Y_3 = 0.5P_1 + 0.5P_2$

1-FIELD PRECEDING FIELD

SUBJECT FIELD

FIG.4

| F1 | F2 | F3 | CLASS |
|----|----|----|-------|
| 0  | 0  | 0  | 0     |
| 0  | 0  | 1  | 1     |
| 0  | 1  | 0  | 2     |
| 0  | 1  | 1  | 3     |
| 1  | 0  | 0  | 4     |
| 1  | 0  | 1  | 5     |
| 1  | 1  | 0  | 6     |
| 1  | 1  | 1  | 7     |

CLASSIFICATION

FIG.5
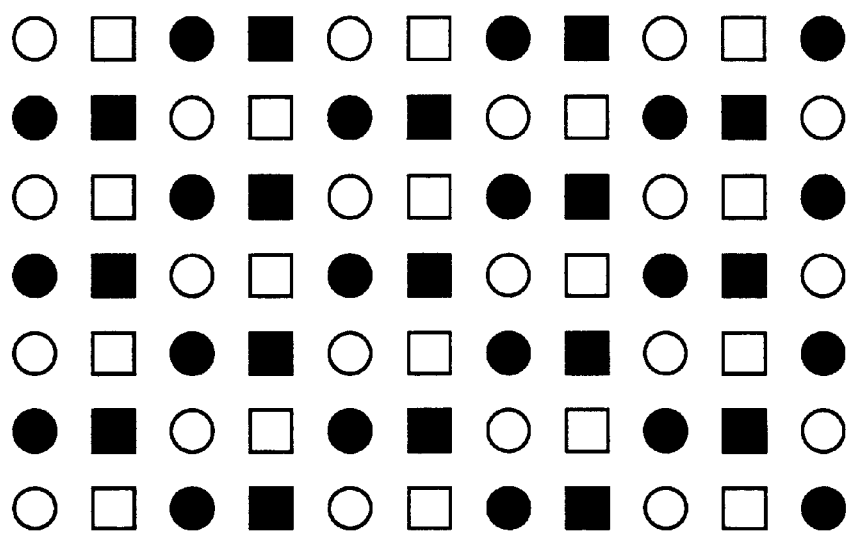
○ ⋯Y-I   □ ⋯Y-Q   ● ⋯Y+I   ■ ⋯Y+Q
(0°)      (90°)     (180°)    (270°)

SUBJECT FIELD

2-FIELD PRECEDING FIELD

○ ⋯Y−I   □ ⋯Y−Q   ● ⋯Y+I   ■ ⋯Y+Q
(0°)      (90°)     (180°)    (270°)

SIGNAL CONVERSION APPARATUS AND METHOD

BACKGROUND OF THE INVENTION

The present invention relates generally to a signal conversion apparatus and a signal conversion method. More particularly, the present invention relates to a signal conversion apparatus and a signal conversion method for converting a composite video signal into component video signals.

As is well known in the art, an NTSC (national television system committee) television signal is produced by multiplexing a luminance signal (Y) and a chrominance signal (C; having I and Q components) by quadrature modulation. Therefore, to receive a television signal and display a picture, it is necessary to separate a luminance signal and a chrominance signal from the television signal (Y/C separation) and then to convert those signals into component signals such as RGB signals by matrix conversion.

However, in a conventional apparatus performing Y/C separation, for example, a luminance signal and a chrominance signal of a particular subject pixel are determined by performing an operation that includes using composite signals of the subject pixel and pixels in the vicinity of the subject pixel, and predetermined fixed coefficients. However, if the coefficients are not suitable for the subject pixel, dot interference, cross-color, or the like may occur, and picture quality will be deteriorated.

It would therefore be beneficial to provide an apparatus and method that make it possible to produce pictures in which deterioration in picture quality due to dot interference, cross-color, or the like is reduced.

OBJECTS OF THE INVENTION

Therefore, it is an object of the invention to provide an improved signal conversion apparatus and method.

Another object of the invention is to provide an improved signal conversion apparatus and method for converting a composite video signal into component video signals.

A further object of the invention is to provide an improved signal conversion apparatus and method utilizing a classification adaptive processing system for a subject pixel to determine the various coefficients to be used for converting the subject pixel of a composite signal into component signals.

Yet another object of the invention is to provide an improved signal conversion apparatus and method which through the use of a classification adaptive processing system for a pixel to be converted reduces dot interference, cross-color or the like between various pixels.

A still further object of the invention is to provide an improved signal conversion apparatus and method which utilizes a classification adaptive processing system in order to reduce deterioration of picture quality during conversion from a composite video signal into component video signals, and during subsequent display.

Still other objects and advantages of the invention will in part be obvious and will in part be apparent from the specification and drawings.

SUMMARY OF THE INVENTION

Generally speaking, in accordance with the invention, a signal conversion apparatus and a signal conversion method are provided in which a plurality of luminance signals of a subject pixel are calculated based on a composite signal of the subject pixel and composite signals of pixels that are close to the subject pixel spatially or temporally, and correlations therebetween are determined. Then, classification is performed for classifying the subject pixel in one of a plurality of prescribed classes based on the correlations between the plurality of luminance signals. Component signals of the subject pixel are determined by performing operations by using coefficients corresponding to the class of the subject pixel. Therefore, it becomes possible to obtain a high-quality picture of component signals.

Furthermore, in a learning apparatus and a learning method according to the invention, component signals for learning are converted into a composite signal for learning, and a plurality of luminance signals of a subject pixel are calculated based on a composite signal of the subject pixel and composite signals of pixels that are close to the subject pixel spatially or temporally. Then, correlations between the plurality of luminance signals are determined and classification is performed by determining the class of the subject pixel based on the correlations. Operations are then performed for determining the coefficients that decrease errors with respect to the component signals for learning for each of the classes of component signals that are obtained by performing operations by using the composite signal for learning and the coefficients. Therefore, it becomes possible to obtain coefficients for obtaining a high-quality picture of component signals.

The invention accordingly comprises the several steps and the relationship of one or more of such steps with respect to each of the others, and the apparatus embodying features of construction, combinations of elements and arrangement of parts which are adapted to affect such steps, all as exemplified in the following detailed disclosure, and the scope of the invention will be indicated in the claims.

BRIEF DESCRIPTION OF THE DRAWINGS

For a more complete understanding of the invention, reference is made to the following description and accompanying drawings, in which:

FIG. 4 depicts a table for performing a process by a classification circuit of FIG. 2;

FIG. 5 depicts an example structure of a field of a digital NTSC signal;

DETAILED DESCRIPTION OF THE PREFERRED EMBODIMENTS

Figure 1:
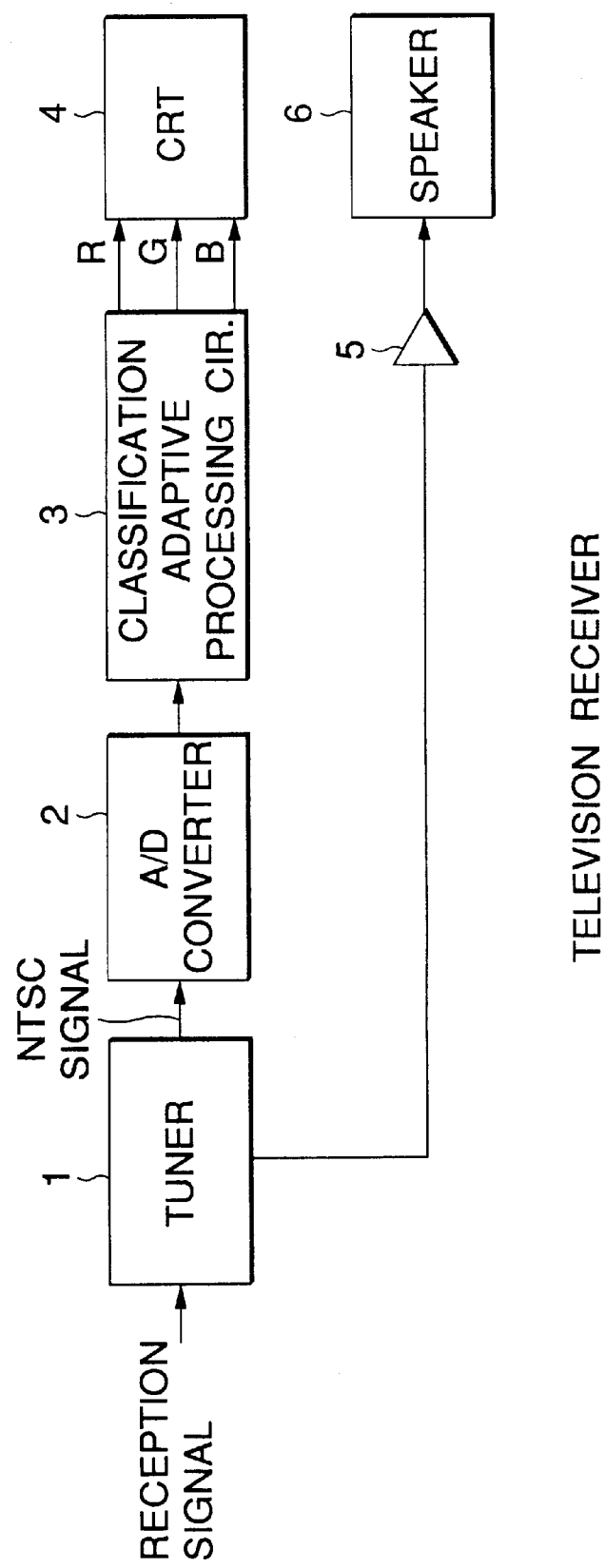
FIG. 1 is a block diagram showing an example configuration of a television receiver constructed in accordance with the invention.

Referring first to FIG. 1, an example configuration of an embodiment of a television receiver to which the invention is applied is shown. A tuner 1 detects and demodulates an NTSC television signal that has been received by an antenna (not shown), and supplies a composite video picture signal (hereinafter referred to as an NTSC signal where appropriate) to an A/D converter 2 and an audio signal to an amplifier 5. A/D converter 2 samples, with predetermined timing, the NTSC signal that is supplied from tuner 1 and thereby sequentially outputs a standard Y–I signal, a Y–Q signal, a Y+I signal, and a Y+Q signal. The digital NTSC signal (Y–I signal, Y–Q signal, Y+I signal, and Y+Q signal) that is output from A/D converter 2 is supplied to a classification adaptive processing circuit 3. If the phase of the Y–I signal is, for instance, 0°, the phases of the Y–Q signal, Y+I signal, and Y+Q signal are 90°, 180°, and 270°, respectively.

Classification adaptive processing circuit 3 calculates a plurality of luminance signals for the subject pixel based on a digital NTSC signal of the subject pixel and digital NTSC signals of pixels that are adjacent to the subject pixel spatially and/or temporally among the received digital NTSC signals, and determines correlations between the plurality of luminance signals. Further, classification adaptive processing circuit 3 classifies the subject pixel by determining to which of a predetermined plurality of classes the subject pixel belongs, based on the correlations between the plurality of luminance signals. Classification adaptive processing circuit 3 then performs a calculation by using prediction coefficients (described below) corresponding to the determined class of the subject pixel, to thereby determine component signals, for instance, RGB signals, of the subject pixel. The RGB signals that have been determined by classification adaptive processing circuit 3 are supplied to a CRT (cathode-ray tube) 4. CRT 4 displays a picture corresponding to the RGB signal supplied from classification adaptive processing circuit 3. Amplifier 5 amplifies an audio signal that is supplied from tuner 1 and supplies an amplified audio signal to a speaker 6. Speaker 6 outputs the audio signal supplied from amplifier 5.

In a television receiver having the above configuration, when a user selects a particular channel by manipulating a remote commander, or by other means (not shown), tuner 1 detects and demodulates a television signal corresponding to the selected channel, and supplies an NTSC signal (i.e., a picture signal of the demodulated television signal) to A/D converter 2 and an audio signal thereof to.

A/D converter 2 converts the analog NTSC signal that is supplied from tuner 1 to a digital signal and supplies resulting signals to classification adaptive processing circuit 3. Classification adaptive processing circuit 3 converts, in the above-described manner, the digital NTSC signal that is supplied from A/D converter 2 into RGB signals. These RGB signals are then supplied to and displayed on CRT 4. Amplifier 5 amplifies the audio signal supplied from tuner 1. An amplified audio signal is supplied to and output from speaker 6.

Figure 2:
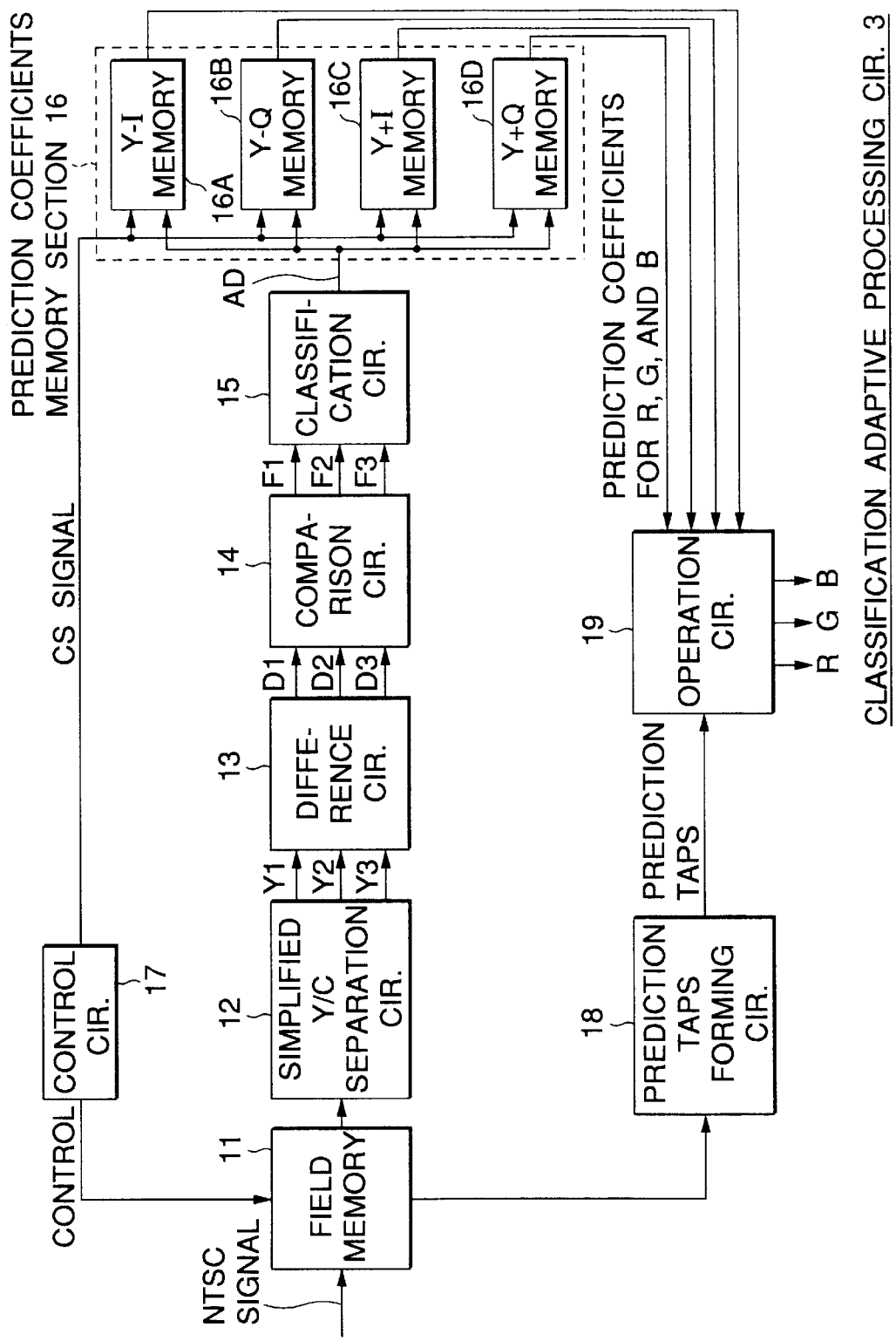
FIG. 2 is a block diagram showing an example configuration of a classification adaptive processing circuit of FIG. 1.

FIG. 2 shows a preferred example configuration of the classification adaptive processing circuit 3 shown in FIG. 1. In FIG. 2, a digital NTSC signal that is input to classification adaptive processing circuit 3 from the A/D converter 2 is supplied to a field memory 11. Field memory 11, which can store digital NTSC signals of at least 3 fields, for example, stores the received NTSC signal under the control of a control circuit 17. Field memory 11 then reads out stored digital NTSC signals and supplies them to a simplified Y/C separation circuit 12 and a prediction taps forming circuit 18. Simplified Y/C separation circuit 12 calculates a plurality of luminance signals for a particular prescribed subject pixel based on a digital NTSC signal of the particular subject pixel and digital NTSC signals of pixels that are adjacent the subject pixel spatially and/or temporally among the digital NTSC signals stored in field memory 11.

Figure 3A:
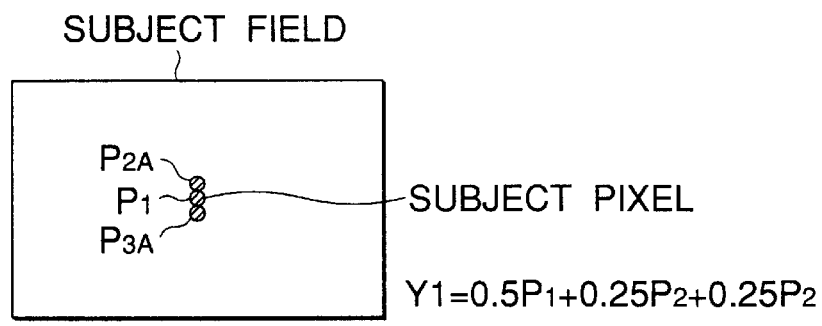
FIG. 3A, FIG. 3B and FIG. 3C depict a process performed by a simplified Y/C separation circuit of FIG. 2.
Figure 3B:
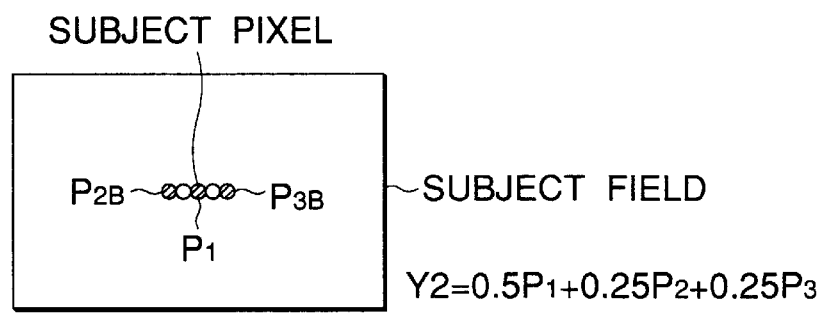
Figure 3C:
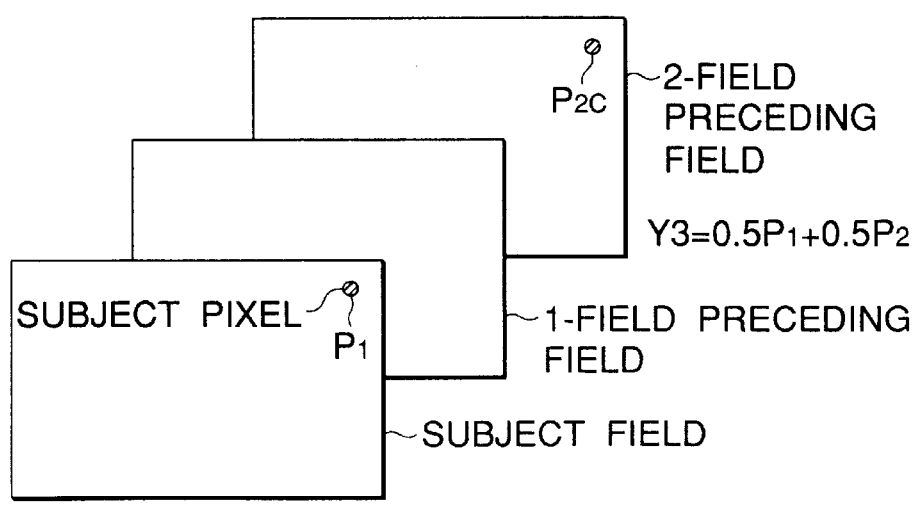

For example, as shown in FIG. 3A, $P_1$ denotes the subject pixel of the subject field and $P_{2A}$ and $P_{3A}$ denote pixels located adjacent above and below the subject pixel $P_1$. Simplified Y/C separation circuit 12 determines the luminance of the subject pixel $P_1$ that is expressed by a formula $Y1=0.5P_1+0.25P_{2A}+0.25P_{3A}$. As a further example, as shown in FIG. 3B, $P_1$ denotes the subject pixel of the subject field and $P_{2B}$ and $P_{3B}$ denote pixels located on the left of and on the right of the subject pixel $P_1$ and adjacent to the respective pixels that are directly adjacent to the subject pixel $P_1$. Simplified Y/C separation circuit 12 determines, as luminance of the subject pixel $P_1$, a luminance signal Y2 that is expressed by a formula $Y2=0.5P_1+0.25P_{2B}+0.25P_{3B}$. Finally, as shown in FIG. 3C, $P_1$ denotes the subject pixel of the subject field and $P_{2C}$ denotes a pixel located at the same position as the subject pixel $P_1$ in a field that is two fields (one frame) preceding the subject field. Simplified Y/C separation circuit 12 determines, as luminance of the subject pixel $P_1$, a luminance signal Y3 that is expressed by a formula $Y3=0.5P_1+0.5P_{2C}$. Thus, simplified Y/C separation circuit 12 determines the above three luminance signals Y1 through Y3 as luminance signals of the subject pixel and outputs these luminance values to a difference circuit 13.

Difference circuit 13 and a comparison circuit 14 determine correlations between the three luminance signals Y1 through Y3 that are supplied from simplified Y/C separation circuit 12. That is, for example, difference circuit 13 determines difference absolute values D1 through D3 that are expressed by the following formulae and supplies these values for D1 through D3 to comparison circuit 14.

$D1=|Y1-Y2|$ $D2=|Y2-Y3|$ $D3=|Y3-Y1|$

Comparison circuit 14 compares the difference absolute values D1 through D3 that are supplied from difference circuit 13 with a predetermined threshold value, and supplies a classification circuit 15 with flags F1 through F3 representing the results of respective comparisons between the three luminance signals Y1 through Y3. Comparison circuit 14 outputs a plurality of flags F1 through F3, each flag having a value of 1 or 0. The value of each of the flags F1 through F3 is 1 when the value of the corresponding difference absolute value D1 through D3 is greater than the predetermined threshold value. The value of each of the flags F1 through F3 is 0 when the value of the corresponding difference absolute value D1 through D3 is smaller than or equal to the predetermined threshold value.

For example, in a preferred embodiment, flag F1 becomes 1 when Y1 and Y2 have a large difference between them and thus a weak correlation, this indicates that the three vertically arranged pixels, including the subject pixel, that were used in determining Y1 (see FIG. 3A or the three horizontally arranged pixels, including the subject pixel, that were used in determining Y2 (see FIG. 3B) include a signal that causes deterioration of the Y/C separation. Specifically, for example, flag F1 becomes 1 when a luminance edge exists in a direction that intersects the vertical or horizontal direction. On the other hand, flag F1 becomes 0 when Y1 and Y2 have a small difference between them and thus a strong correlation. This indicates that the three vertically arranged pixels including the subject pixel that were used in determining Y1 (see FIG. 3A) and the three horizontally arranged pixels, including the subject pixel, that were used in determining Y2 (see FIG. 3B) do not include a signal that causes deterioration of the Y/C separation.

Flag F2 becomes 1 when Y2 and Y3 have a large difference between them and thus a weak correlation. This indicates that the three horizontally arranged pixels, including the subject pixel, that were used in determining Y2 (see FIG. 3B) or the two temporally arranged pixels that were used in determining Y3 (see FIG. 3C) include a signal that causes deterioration of the Y/C separation. Specifically, for example, flag F2 becomes 1 when a luminance edge exists in a direction that intersects the vertical direction or the subject pixel has a movement. On the other hand, flag F2 becomes 0 when Y2 and Y3 have a small difference between them and thus a strong correlation. This indicates that the three horizontally arranged pixels, including the subject pixel, that were used in determining Y2 (see FIG. 3B) and the two temporally arranged pixels that were used in determining Y3 (see FIG. 3C) do not include a signal that causes deterioration of the Y/C separation.

A description for flag F3 is omitted because the above description for flag F2 applies to flag F3 except that for Y1 and Y2 the horizontal direction and the vertical direction should be interchanged.

A classification circuit 15 performs classification by classifying the subject pixel as being part of a prescribed class based on flags F1–F3 that are supplied from comparison circuit 14. Classification circuit 15 supplies, as an address, the class of the determined subject pixel to a prediction coefficients memory section 16. That is, the classification circuit 15 employs, for instance in a preferred embodiment, one of eight values 0 to 7 as shown in FIG. 4 in accordance with flags F1–F3 that are supplied from comparison circuit 14. This value is then supplied to a prediction coefficients memory section 16 as an address.

Prediction coefficients memory section 16 comprises a Y–I memory 16A, a Y–Q memory 16B, a Y+I memory 16C, and a Y+Q memory 16D. Each of these memories is supplied with the class of the subject pixel as an address that is output from classification circuit 15 as well as with a CS (chip select) signal that is output from a control circuit 17. The Y–I memory 16A, Y–Q memory 16B, Y+I memory 16C, and Y+Q memory 16D store, for the respective phases of an NTSC signal, prediction coefficients for the respective classes to be used for converting an NTSC signal of the subject pixel into RGB signals.

FIG. 5 shows pixels that constitute a particular field of an NTSC signal. In FIG. 5, marks "○" indicate Y–I signals that are signals having a phase 0°, marks "□" indicate Y–Q signals that are signals having a phase 90°, marks "●" indicate Y+I signals that are signals having a phase 180°, marks "■" indicate Y+Q signals that are signals having a phase 270°. As shown in FIG. 5, Y–I signals, Y–Q signals, Y+I signals, and Y+Q signals are arranged repeatedly. Y–I signals and Y+I signals are arranged alternately in one column and Y–Q and Y+Q signals are arranged alternately in an adjacent column.

Returning to FIG. 2, Y–I memory 16A, Y–Q memory 16B, Y+I memory 16C, and Y+Q memory 16D (hereinafter collectively referred to as memories 16A–16D where appropriate) store prediction coefficients for the respective classes to be used for converting a Y–I signal, a Y–Q signal, a Y+I signal, and a Y+Q signal into RGB signals. Prediction coefficients corresponding to the class of the subject pixel that is supplied from classification circuit 15 are read out from the selected memory 16A–16D in accordance with a CS signal from control circuit 17 and supplied to an operation circuit 19. Each of the memories 16A–16D stores, as prediction coefficients for the respective classes, prediction coefficients for R, G, and B to be used for converting an NTSC signal into R, G and B signals.

Control circuit 17 controls read and write operations by field memory 11. That is, control circuit 17 selects the subject field from among a plurality of fields stored in the field memory 11. When processing for a particular subject field has been completed, control circuit 17 instructs the next field to be read from field memory 11 as a new subject field. Further, control circuit 17 also causes field memory 11 to store a newly supplied field in place of the field that has been provided as the subject field in a first-in, first-out arrangement. Further, control circuit 17 instructs field memory 11 to provide pixels of the subject field sequentially in line scanning order to simplified Y/C separation circuit 12, and also to provide pixels that are necessary for processing the subject pixel from field memory 11 to simplified Y/C separation circuit 12 and to prediction taps forming circuit 18. Control circuit 17 outputs the CS signal for selecting one of the memories 16A–16D corresponding to the phase of the subject pixel. That is, control circuit 17 supplies the prediction coefficients memory section 16 with CS signals for selecting the Y–I memory 16A, Y–Q memory 16B, Y+I memory 16C, and Y+Q memory 16D when the NTSC signal of the subject pixel is a Y–I signal, a Y–Q signal, a Y+I signal, and a Y+Q signal, respectively.

Figure 6A:
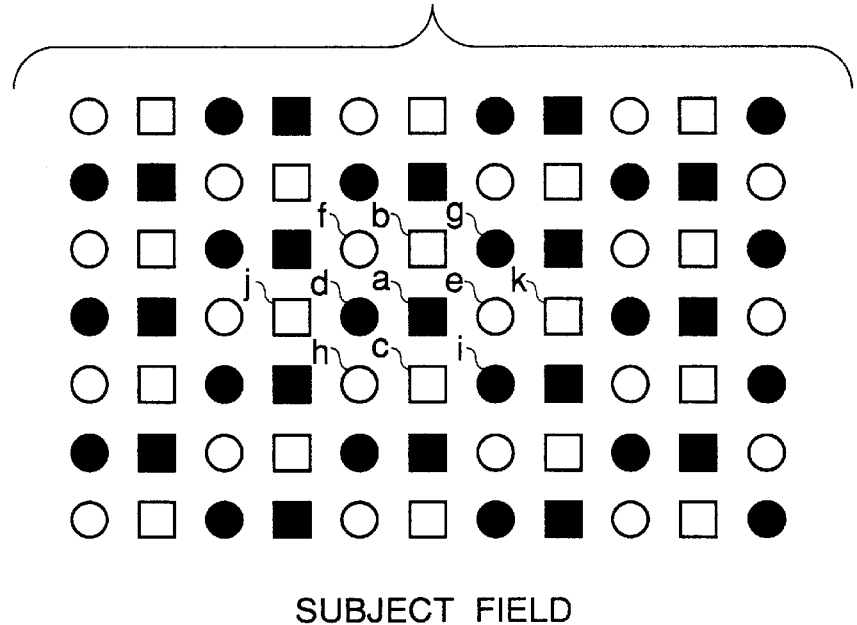
FIG. 6A and FIG. 6B depict a process executed by a prediction taps forming circuit of FIG. 2.
Figure 6B:
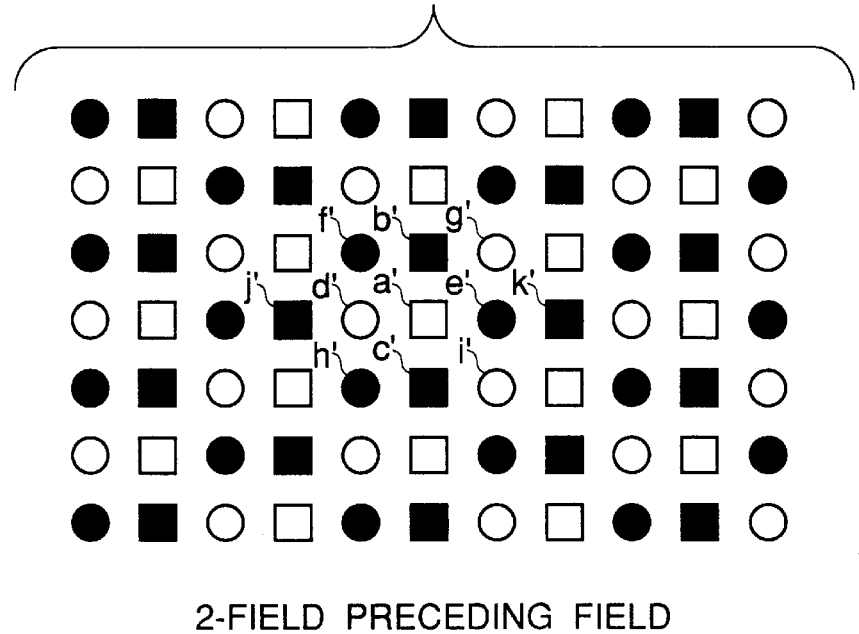

Prediction taps forming circuit 18 is supplied with pixels that have been read out from field memory 11. Based on these supplied pixels, prediction taps forming circuit 18 forms prediction taps to be used for converting an NTSC signal of the subject signal into RGB signals, and supplies the prediction taps to operation circuit 19. Specifically, for example, when pixel "a" in the subject field shown in FIG. 6A is considered the subject pixel, prediction taps forming circuit 18 employs, as prediction taps, pixels "b" through "e" in the subject field located above, below, on the left of, and on the right of the subject pixel "a" and adjacent thereto, pixels "f" through "i" located at top-left, top-right, bottom-left, and bottom-right positions of the subject pixel "a" and adjacent thereto, pixel "j" located to the left of the subject pixel and adjacent to a pixel "d" that is directly adjacent to the subject pixel "a", pixel "k" located to the right of the subject pixel "e" and adjacent to a pixel that is directly adjacent to the subject pixel "a", and pixels "a'" through "k'" located at the same positions as pixels "a" through "k" in a field that is two fields preceding the subject field (see FIG. 6B). These prediction taps are forwarded to operation circuit 19.

Operation circuit 19 calculates RGB signals of the subject pixel by using prediction coefficients that are supplied from prediction coefficients memory 16 and prediction taps that are supplied from prediction taps forming circuit 18. As described above, operation circuit 19 is supplied with sets of prediction coefficients to be used for converting an NTSC signal of the subject pixel into R, G, and B signals (from prediction coefficients memory 16) as well as with prediction taps formed for the subject pixel (from prediction taps forming circuit 18; see FIG. 6), where the pixels constituting the prediction taps are pixels "a" through "k" and "a'" through "k'" as described above in connection with FIG. 6, the prediction coefficients for R are $W_{Ra}$ through $W_{Rk}$ and $W_{RA}$ through $W_{RK}$, the prediction coefficients for G are $W_{Ga}$ through $W_{Gk}$ and $W_{GA}$ through $W_{GK}$, and the prediction coefficients for B are $W_{Ba}$ through $W_{Bk}$ and $W_{BA}$ through $W_{BK}$, the operation circuit 19 calculates R, G, and B signals of the subject pixel according to the following linear first-order equations:

$$R = w_{Ra}a + w_{Rb}b + w_{Rc}c + w_{Rd}d + w_{Re}e + \\ w_{Rf}f + w_{Rg}g + w_{Rh}h + w_{Ri}i + w_{Rj}j + w_{Rk}k + \\ w_{RA}a' + w_{RB}b' + w_{RC}c' + w_{RD}d' + w_{RE}e' + \\ w_{RF}f' + w_{RG}g' + w_{RH}h' + w_{RI}i' + w_{RJ}j' + \\ w_{RK}k' + w_{Roffset}$$ (1)

$$G = w_{Ga}a + w_{Gb}b + w_{Gc}c + w_{Gd}d + w_{Ge}e + \\ w_{Gf}f + _{Gg}g + w_{Gh}h + w_{Gi}i + w_{Gj}j + w_{Gk}k + \\ w_{GA}a' + w_{GB}b' + w_{GC}c' + w_{GD}d' + w_{GE}e' + \\ w_{GF}f' + w_{GG}g' + w_{GH}h' + w_{GI}i' + w_{GJ}j' + \\ w_{GK}k' + w_{Goffset}$$

$$B = w_{Ba}a + w_{Bb}b + w_{Bc}c + w_{Bd}d + w_{Be}e + \\ w_{Bf}f + w_{Bg}g + w_{Bh}h + w_{Bi}i + w_{Bj}j + w_{Bk}k + \\ w_{BA}a' + w_{BB}b' + w_{BC}c' + w_{BD}d' + w_{BE}e' + \\ w_{BF}f' + w_{BG}g' + w_{BH}h' + w_{BI}i' + w_{BJ}j' + \\ w_{BK}k' + w_{Boffset}$$

$W_{Roffset}$, $W_{Goffset}$, and $W_{Boffset}$ are constant terms for correcting a bias difference between an NTSC signal and RGB signals, and are included in the respective sets of prediction coefficients for R, G, and B.

As described above, in operation circuit 19, the process that uses coefficients (prediction coefficients) corresponding to the class of the subject pixel, that is, the process that adaptively uses prediction coefficients corresponding to the property (characteristic) of the subject pixel, is called an adaptive process. The adaptive process will now be briefly described. By way of example, prediction value E[y] of a component signal y of the subject pixel may be determined by using a linear first-order combination model that is prescribed by linear combinations of composite signals (hereinafter referred to as learning data where appropriate) $x_1, x_2, \ldots$ of pixels (including the subject pixel) that are adjacent to the subject pixel spatially and/or temporally and predetermined prediction coefficients $w_1, w_2, \ldots$. This prediction value E[y] can be expressed by the following equation.

$$E[y] = w_1 x_1 + w_2 x_2 + \quad (2)$$

For generalization, a matrix W that is a set of prediction coefficients w, a matrix X that is a set of learning data, and a matrix Y' that is a set of prediction values E[y] are defined as follows:

$$X = \begin{pmatrix} x_{11} & x_{12} & \cdots & x_{1n} \\ x_{21} & x_{22} & \cdots & x_{2n} \\ \cdots & \cdots & \cdots & \cdots \\ x_{m1} & x_{m2} & \cdots & x_{mn} \end{pmatrix}$$ (3)

$$W = \begin{pmatrix} W_1 \\ W_2 \\ \cdots \\ W_n \end{pmatrix}, Y' = \begin{pmatrix} E[y_1] \\ E[y_2] \\ \cdots \\ E[y_m] \end{pmatrix}$$

The following observation equation holds:

$$XW = Y' \quad (4)$$

Prediction values E[y] that are similar to component signals y of subject pixels are determined by applying a least squared method to this observation equation. In this case, a matrix Y that is a set of true component signals y of subject pixels as teacher data and a matrix E that is a set of residuals e of prediction values E[y] with respect to the component signals y are defined as follows:

$$E = \begin{pmatrix} e_1 \\ e_2 \\ \cdots \\ e_m \end{pmatrix}, Y = \begin{pmatrix} y_1 \\ y_2 \\ \cdots \\ y_m \end{pmatrix}$$ (5)

From equation (4) and (5), the following residual equation holds:

$$XW = Y + E \quad (6)$$

In this case, prediction coefficients $w_i$ for determining prediction values E[y] that are similar to the component signals y are determined by minimizing the following squared error:

$$\sum_{i=1}^{m} e_i^2 \quad (7)$$

Therefore, prediction coefficients $w_i$ that satisfy the following equations (derivatives of the above squared error when the prediction coefficients $w_i$ are 0) are optimum values for determining prediction values E[y] similar to the component signals y.

$$e_1 \frac{\partial e_1}{\partial w_i} + e_2 \frac{\partial e_2}{\partial w_i} + \cdots + e_m \frac{\partial e_m}{\partial w_m} = 0 (i = 1, 2, \ldots, n) \quad (8)$$

In view of the above, first, the following equations are obtained by differentiating equation (8) with respect to prediction coefficients $w_i$.

$$\frac{\partial e_i}{\partial w_1} = x_{i1}, \frac{\partial e_1}{\partial w_2} = x_{i2}, \ldots, \frac{\partial e_i}{\partial w_n} = x_{in}, (i = 1, 2, \ldots, m) \quad (9)$$

Equation (10) is obtained from equations (8) and (9).

$$\sum_{i=1}^{m} e_i x_{i1} = 0, \sum_{i=1}^{m} e_i x_{i2} = 0, \cdots \sum_{i=1}^{m} e_i x_{in} = 0 \quad (10)$$

By considering the relationship between the learning data x, the prediction coefficients w, the teacher data y, and the residuals e in the residual equation (8), the following normal equations can be obtained from equation (10):

$$\begin{cases} \left(\sum_{i=1}^{m} x_{i1}x_{i1}\right)w_1 + \left(\sum_{i=1}^{m} x_{i1}x_{i2}\right)w_2 + \cdots + \left(\sum_{i=1}^{m} x_{i1}x_{in}\right)w_n = \left(\sum_{i=1}^{m} x_{i1}y_i\right) \\ \left(\sum_{i=1}^{m} x_{i2}x_{i1}\right)w_1 + \left(\sum_{i=1}^{m} x_{i2}x_{i2}\right)w_2 + \cdots + \left(\sum_{i=1}^{m} x_{i2}x_{in}\right)w_n = \left(\sum_{i=1}^{m} x_{i2}y_i\right) \\ \left(\sum_{i=1}^{m} x_{in}x_{i1}\right)w_1 + \left(\sum_{i=1}^{m} x_{in}x_{i2}\right)w_2 + \cdots + \left(\sum_{i=1}^{m} x_{in}x_{in}\right)w_n = \left(\sum_{i=1}^{m} x_{in}y_i\right) \end{cases} \quad (11)$$

The normal equations (11) can be obtained in the same number as the number of prediction coefficients w to be determined. Therefore, optimum prediction coefficients w can be determined by solving equations (11) (for equations (11) to be soluble, the matrix of the coefficients of the prediction coefficients W need to be regular). To solve equations (11), it is possible to use a sweep-out method (Gauss-Jordan elimination method) or the like.

The adaptive process is a process for determining optimum prediction coefficients w in the above manner and then determining prediction values E[y] that are close to the component signals y according to equation (2) by using the optimum prediction coefficients w (the adaptive process includes a case of determining prediction coefficients w in the advance and determining prediction values by using the prediction coefficients w). The prediction coefficients memory section 16 shown in FIG. 2 stores, for the respective phases of an NTSC signal, prediction coefficients of respective classes for R, G, and B that are determined by establishing the normal equations (11) by a learning process described below, and by then solving those normal equations. In this embodiment, as described above, the prediction coefficients include the constant terms $W_{Roffset}$, $W_{Goffset}$, and $W_{Boffset}$. These constant terms can be determined by extending the above technique and solving normal equations (11).

Figure 7:
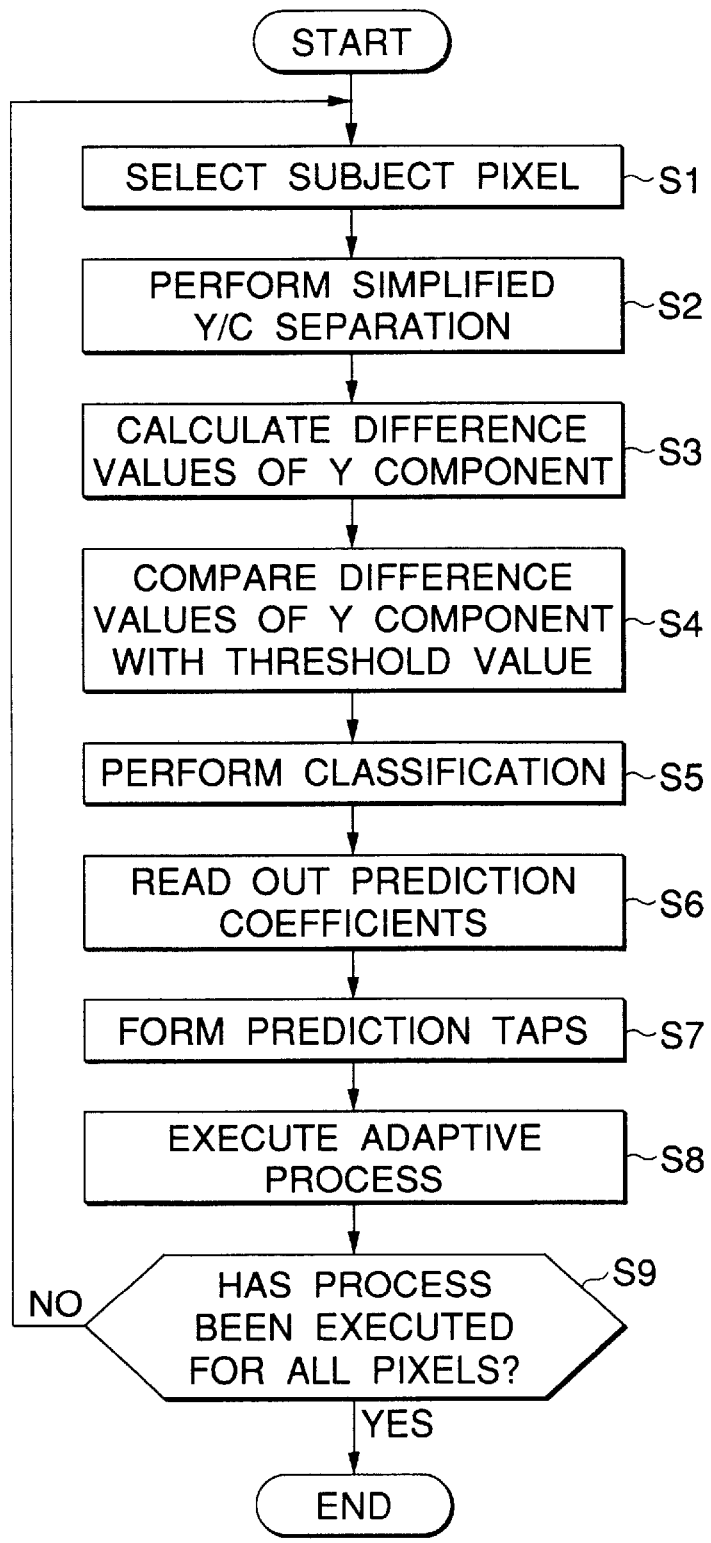
FIG. 7 depicts a flowchart of a process executed by the classification adaptive processing circuit of FIG. 2.

Next, the process executed by the classification adaptive processing circuit 3 shown in FIG. 2 will be described with reference to a flowchart of FIG. 7. After a digital NTSC signal has been stored in field memory 11 at step S1, a particular field is selected as the subject field and a particular pixel in the subject field is selected as the subject pixel by control circuit 17. Control circuit 17 causes additional pixels (described in connection with FIG. 3) necessary for performing simplified Y/C separation on the subject pixel to be read out from field memory 11 and supplied to simplified Y/C separation circuit 12.

At step S2, simplified Y/C separation circuit 12 performs simplified Y/C separation by using the pixels supplied from field memory 11. Three luminance signals Y1–Y3 are determined for the subject pixel in the manner as described above and supplied to difference circuit 13. At step S3, difference circuit 13 supplies difference absolute values D1–D3, based upon the luminance signals Y1–Y3 that are supplied from the simplified Y/C separation circuit 12 and that are calculated in the manner described above, to comparison circuit 14. At step S4, comparison circuit 14 compares the difference absolute values D1–D3 that are supplied from difference circuit 13 with respective predetermined threshold values. Flags F1–F3, indicating magnitude relationships with the threshold value as described above, are supplied to classification circuit 15.

At step S5, classification circuit 15 classifies the subject pixel based on flags F1–F3 that are supplied from comparison circuit 14 in the manner described above in connection with FIG. 4. A resulting class into which the subject pixel is classified is forwarded to prediction coefficients memory section 16 as an address. At this time, control circuit 17 supplies prediction coefficients memory section 16 with CS signals for selecting the Y–I memory 16A, Y–Q memory 16B, Y+I memory 16C, and Y+Q memory 16D when the NTSC signal of the subject pixel is a Y–I signal, a Y–Q signal, a Y+I signal, and a Y+Q signal, respectively.

At step S6, respective sets of prediction coefficients for R, G, and B at an address corresponding to the class of the subject pixel that is supplied from the classification circuit 15 are read out from one of the memories 16A–16D that is selected in accordance with the CS signal that is supplied from control circuit 17, and supplied to operation circuit 19.

At step S7, control circuit 17 causes pixels to be read from field memory 11 to prediction taps forming circuit 18 and prediction taps forming circuit 18 forms prediction taps as described above in connection with FIG. 6 for the subject pixel. The prediction taps are supplied to operation circuit 19. Step S7 can be executed parallel with steps S2–S6.

After receiving the prediction coefficients from prediction coefficients memory section 16 and the prediction taps from prediction taps forming circuit 18, at step S8 operation circuit 19 executes the adaptive process as described above. Specifically, operation circuit 19 determines R, G, and B signals of the subject pixel by calculating linear first-order equations (1), and outputs those signals.

Then, at step S9, control circuit 17 determines whether the process has been executed for all pixels constituting the subject field that are stored in the field memory. If it is determined at step S9 that the process has not been executed yet for all pixels constituting the subject field, the process returns to step S1, where one of the pixels constituting the subject field that has not been employed as the subject pixel is utilized as a new subject pixel. Then, step S2 and the following steps are repeated. If it is judged at step S9 that the process has been executed for all pixels constituting the subject field, the process is finished. Steps S1–S9 in the flowchart of FIG. 7 are repeated every time a new field is employed as the subject field.

Figure 8:
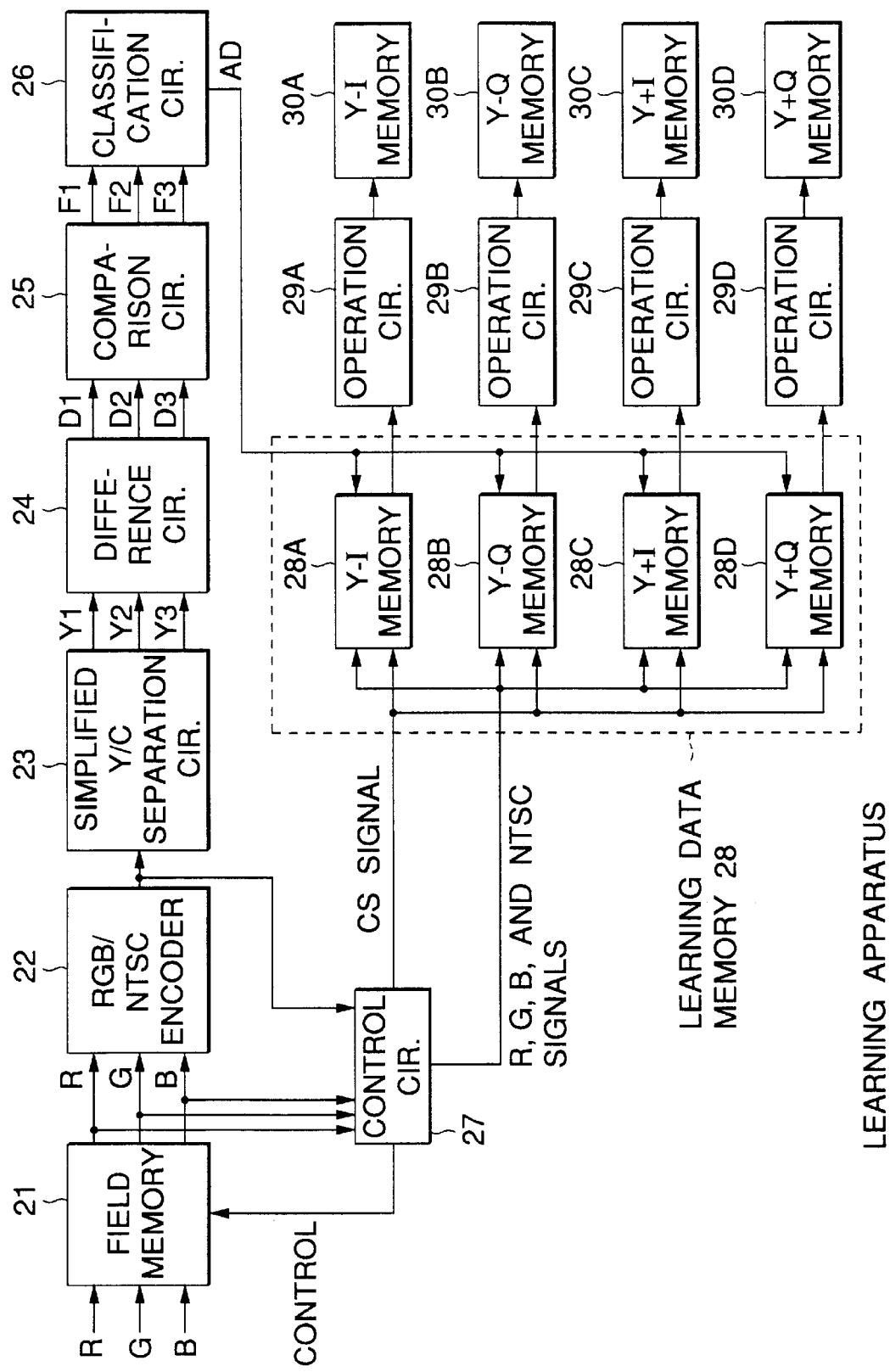
FIG. 8 is a block diagram showing a learning apparatus constructed in accordance with the invention.

FIG. 8 shows an example configuration of an embodiment of a learning apparatus for determining prediction coefficients of respective classes for R, G and B signals to be stored in prediction coefficients memory section 16 shown in FIG. 2. A picture, including a predetermined number of fields of RGB signals for learning (component signals for learning), is supplied to a field memory 21 and stored therein. RGB signals of pixels constituting the picture for learning are read out from field memory 21 under the control of a control circuit 27, and supplied to an RGB/NTSC encoder 22 and to control circuit 27. RGB/NTSC encoder 22 encodes (converts) the RGB signal of each pixel that is supplied from field memory 21 into a digital NTSC signal. The digital NTSC signal is in turn supplied to a simplified Y/C separation circuit 23 and to control circuit 27. Simplified Y/C separation circuit 23, a difference circuit 24, a comparison circuit 25, and a classification circuit 26 are configured in the same manner as simplified Y/C separation circuit 12, difference circuit 13, comparison circuit 14, and classification circuit 15 shown in FIG. 2, respectively. A class code indicative of a class to which the subject pixel belongs is output from classification circuit 15 and is supplied to a learning data memory section 28 as an address.

Control circuit 27 sequentially designates one or more fields stored in field memory 21 as the subject field in line scanning order, for instance, and causes RGB signal of pixels that are necessary for processing the subject pixel to be additionally read out from field memory 21 and supplied to the RGB/NTSC encoder 22, and to control circuit 27 itself. Specifically, control circuit 27 causes RGB signals of pixels that are necessary for performing simplified Y/C separation (described above in connection with FIG. 3) on the subject pixel to be read out and supplied to RGB/NTSC encoder 22. The RGB signals of the pixels necessary for performing simplified Y/C separation are converted into a digital NTSC signal by RGB/NTSC encoder 22, and the digital NTSC signal is supplied to simplified Y/C separation circuit 23. Control circuit 27 also causes RGB signals of the subject pixel and RGB signal of pixels constituting prediction taps for the subject pixel to be read out from field memory 21, and causes the RGB signal of the subject pixel to be supplied to control circuit 27 itself and the RGB signals of the pixels constituting the prediction taps to be supplied to RGB/NTSC encoder 22. As a result, the RGB signals of the pixels constituting the prediction taps are converted into digital NTSC signals (composite signals for learning) in RGB/NTSC encoder 22, and the digital NTSC signals are supplied to control circuit 27.

Further, when receiving the digital NTSC signals of the pixels constituting the prediction taps from RGB/NTSC encoder 22 in the above manner, control circuit 27 employs the prediction taps of the digital NTSC signal as learning data and employs, as teacher data, the RGB signals of the subject pixel that have been read out from field memory 21. Control circuit 27 collects the learning data and the teacher data and supplies the collected data to learning data memory section 28. That is, the RGB signals of the subject pixel are collected with the digital NTSC signals of the pixels having the positional relationships with the subject pixel as described above in connection with FIG. 6, and the collected data are supplied to learning data memory section 28.

Control circuit 27 then outputs a CS signal for selection one of a Y–I memory 28A, a Y–Q memory 28, a Y+I memory 28C, and a Y+Q memory 28D (described later; hereinafter collectively referred to as memories 28A–28D where appropriate) that constitute the learning data memory section 28 corresponding to the phase of the subject pixel. That is, control circuit 27 supplies learning data memory section 28 with CS signals for section Y–I memory 28A, Y–Q memory 28B, Y+I memory 28C, and Y+Q memory 28D when the digital NTSC signal of the subject pixel is a Y–I signal, a Y–Q signal, a Y+I signal, and a Y+Q signal, respectively.

Learning data memory section 28 is composed of Y–I memory 28A, Y–Q memory 28B, Y+I memory 28C, and Y+Q memory 28D, which are supplied with the class of the subject pixel as an address that is output from classification circuit 26 as well as with a CD signal that is output from control circuit 27. Learning data memory section 28 is supplied with the above-mentioned collection of teacher data and learning data. The collection of teacher data and learning data that is output from control circuit 27 is stored in one of memories 28A–28D selected by CS signal, that is supplied from control circuit 27, at an address corresponding to the class of the subject pixel, the class being output from classification circuit 26.

Therefore, the collections of the RGB signals (teacher data) of the subject pixel and the digital NTSC signals of the pixels constituting the prediction taps for the subject pixel in cases where the digital NTSC signal of the subject pixel is a Y–I signal, a Y–Q signal, a Y+I signal, and a Y+Q signal are stored in Y–I memory 28A, Y–Q memory 28B, Y+I memory 28C, and Y+Q memory 28D, respectively. That is, the collection of the teacher data and the learning data is stored in learning data memory section 28 for each phase of the NTSC signal of the subject pixel. Each of the memories 28A–28B is configured so as to be able to store plural pieces information at the same address, whereby plural collections of learning data and teacher data of pixels that are classified in the same class can be stored at the same address.

After the process has been executed by employing, as the subject pixel, all pixels constituting the picture for learning that is stored in field memory, each of operation circuits 29A–29D reads out collections of NTSC signals of pixels constituting prediction taps as learning data and RGB signals as teacher data that are stored at each address of each of memories 28A–28D. Each operation circuit 29A, 29B, 29C, or 29D then calculates, by a least squares method, prediction coefficients that minimize errors between prediction values of RGB signals and the teacher data. That is, each of operation circuits 29A–29D establishes normal equations (11) for each class and each of the R, G, and B signals, and determines prediction coefficients for R, G, and B (R prediction coefficients $W_{Ra}$ through $W_{Rk}$, $W_{RA}$ through $W_{RK}$, and $W_{Roffset}$, G prediction coefficients $W_{Ga}$ through $W_{Gk}$, $W_{GA}$ through $W_{GK}$, and $W_{Goffset}$, and B prediction coefficients $W_{Ba}$ through $W_{Bk}$, $W_{BA}$ through $W_{BK}$, and $W_{Boffset}$) for each class by solving the normal equations.

Since operation circuits 29A–29D execute processes by using data stored in memories 28A–28D, respectively, they generate prediction coefficients for the respective phases of a digital NTSC signal, that is, coefficients for converting a Y–I signal, a Y–Q signal, a Y+I signal, and a Y+Q signal into RGB signals, respectively. Each of a Y–I memory 30A, a Y–Q memory 30B, a Y+I memory 30C, and a Y+Q memory 30D (hereinafter collectively referred to as memories 30A–30D where appropriate) stores sets of prediction coefficients for R, G, and B that have been determined by the operation circuit 29A, 29B, 29C, or 29D at an address corresponding to each class, to be used for converted a Y–I signal, a Y–Q signal, a Y+I signal, or a Y+Q signal into RGB signals.

Figure 9:
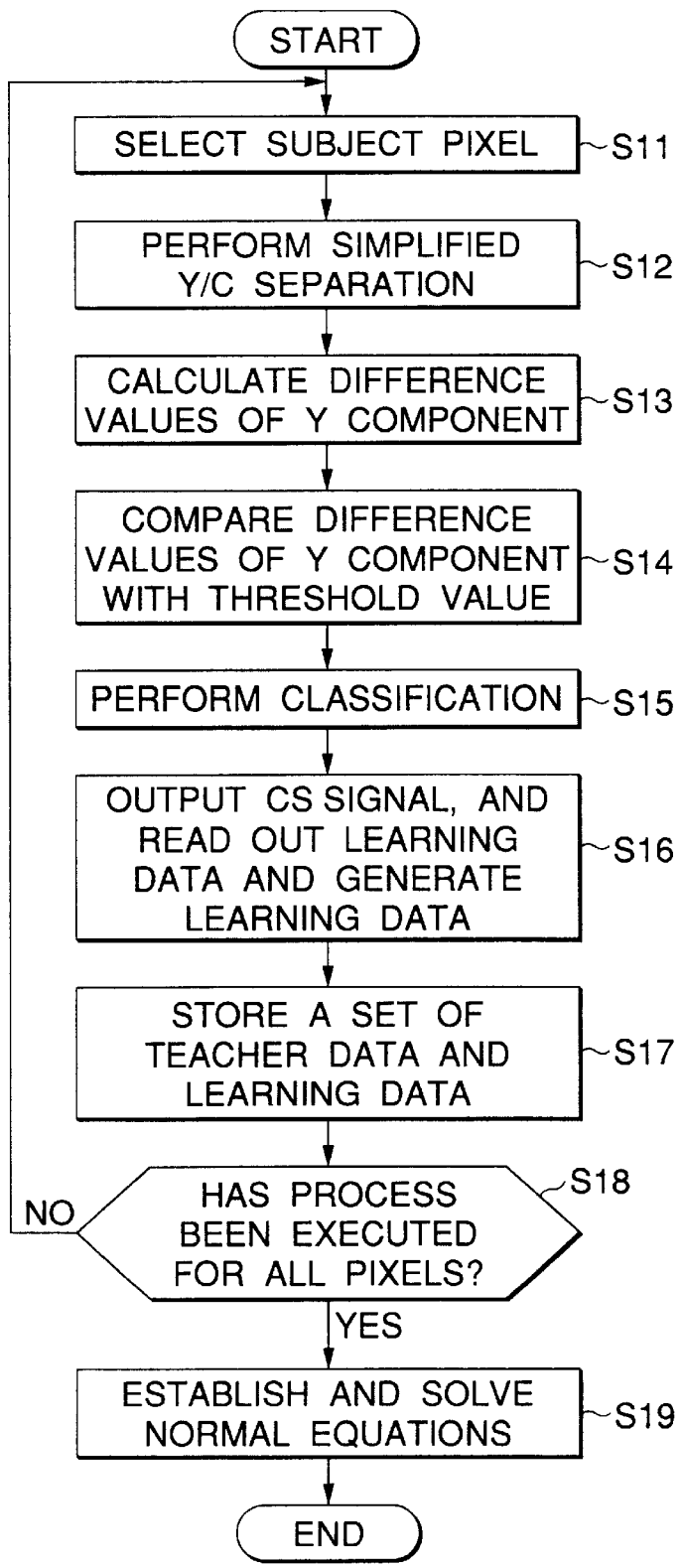
FIG. 9 depicts a flowchart of a learning process executed by the learning apparatus of FIG. 8.

Next, a learning process executed in the learning apparatus of FIG. 8 will be described with reference to the flowchart of FIG. 9. After RGB signals of a picture for learning have been stored in field memory 21, at step S11 control circuit 27 selects a certain pixel from the picture for learning as the subject pixel. Then, control circuit 27 also causes the additional pixels necessary for performing simplified Y/C separation on the subject pixel to be read out from field memory 21 and supplied to RGB/NTSC encoder 22. In RGB/NTSC encoder 22, the RGB signals of the respective pixels that are supplied from field memory 21 are converted into digital NTSC signals, which are supplied to simplified Y/C separation circuit 23.

At step S12, simplified Y/C separation circuit 23 performs simplified Y/C separation by using the pixels supplied from RGB/NTSC encoder 22, whereby three luminance signals Y1–Y3 are determined for the subject pixel in the same manner as described above in connection with FIG. 2, and are then supplied to difference circuit 24. Thereafter, at steps S13–S15, difference circuit 24, comparison circuit 25, and classification circuit 26 executes the same processes as set forth in steps S3–S5 of FIG. 7, whereby a class to which the subject pixel belongs is output from classification circuit 26. The class of the subject pixel is forwarded to learning data memory section 28 as an address.

At step S16, control circuit 27 supplies the learning data memory section 28 with CS signals for selecting the Y–I memory 28A, Y–Q memory 28B, Y+I memory 28C, and Y+Q memory 28D when the digital NTSC signal allocated to the subject pixel is a Y–I signal, a Y–Q signal, a Y+I signal, and a Y+Q signal, respectively. Further, at step S16, control circuit 27 causes RGB signals of the subject pixel and RGB signals of pixels constituting prediction taps for the subject pixel to be read out from field memory 21. The RGB signals of the subject pixel are then supplied to control circuit 27 itself and the RGB signals of the pixels constituting the prediction taps are supplied to RGB/NTSC encoder 22. In this case, RGB/NTSC encoder 22 converts the RGB signals of the pixels constituting the prediction taps into digital NTSC signals, which are also supplied to the control circuit 27.

Then, control circuit 27 employs, as learning data, the digital NTSC signals of the pixels constituting the prediction taps that are supplied from RGB/NTSC encoder 22, and employs, as teacher data, the RGB signals of the subject pixel that are supplied from field memory 21. Control circuit 27 collects the learning data and the teacher data and supplies the collected data to learning data memory section 28. Step S16 can be executed parallel with steps S12–S15. At step S17, the collection of the teacher data and the learning data that is output from control circuit 27 is stored in one of memories 28A–28D at an address corresponding to the class of the subject pixel that is output from classification circuit 26. The particular memory used for storage is selected by the CS signal that is supplied from control circuit 27.

Then, at step S18, control circuit 27 determines whether the process has been executed for all pixels constituting the picture for learning that is stored in field memory 21. If it is determined at step S18 that the process has not been executed for all pixels constituting the picture for learning, the process returns to step S11, where a pixel that has not yet been the subject pixel is employed as a new subject pixel. Then, step S12 and the following steps are repeated.

If it is determined at step S18 that the process has been executed for all pixels constituting the picture for learning, the process proceeds to step S19. At step S19, each of the operation circuits 29A–29D reads out collections of learning data and teacher data at each address from the memory 28A, 28B, 28C or 28D, and normal equations (11) are established for each of R, G, and B. Further, the established normal equations are also solved at step S19, whereby sets of prediction coefficients to be used for converting a Y–I signal, a Y–Q signal, a Y+I signal, or a Y+Q signal into RGB signals are determined for each class. The sets of prediction coefficients of the respective classes corresponding to a Y–I signal, a Y–Q signal, a Y+I signal, and a Y+Q signal are supplied to and stored in respective memories 30A–30D. The learning process is then completed. The sets of prediction coefficients for R, G and B stored in memories 30A–30D are then stored for each class in the respective memories 16A–16D shown in FIG. 2.

In the above learning process, there may occur a class for which a necessary number of normal equations for determining prediction coefficients are not obtained. For such a class, for example, prediction coefficients that are obtained by establishing normal equations, after disregarding particular classes, and solving those normal equations may be employed as default prediction coefficients.

As described above, the subject pixel is classified based on correlations between a plurality of luminance signals that are determined for the subject pixel, and a digital NTSC signal of the subject pixel. The subject pixel is converted into RGB signals by using prediction coefficients corresponding to a class obtained from the prediction coefficients suitable for the subject pixel. Therefore, in particular, the frequency of occurrence of dot interference due to a luminance edge and cross-color, that is, a luminance-dependent variation in color, can be reduced.

In the above embodiments, since an NTSC signal is directly converted into RGB signals (prediction coefficients for such a conversion are determined by learning), the scale of the apparatus can be made smaller than in conventional cases where RGB signals are determined by Y/C-separating an NTSC signal and matrix-converting resulting YIQ signals. That is, for example, where RGB signals are determined by Y/C-separating an NTSC signal and matrix-converting resulting YIQ signals, both of a chip for the Y/C separation and a chip for the matrix conversion are needed. In contrast, the classification adaptive processing circuit 3 shown in FIG. 2 can be constructed in the form of one chip.

Although in the above embodiments an NTSC signal is converted into RGB signals by calculating linear first-order formulae of the NTSC signal and prediction coefficients, the NTSC signal can be converted into RGB signals by other methods, for example, by calculating nonlinear operation formulae.

Although in the above embodiments simplified Y/C separation is performed by using pixels that are arranged in three directions, that is, arranged horizontally or vertically, or located at the same positions and arranged temporally, other methods can be used. For example, it is possible to perform simplified Y/C separation by using pixels that are spatially arranged in oblique directions or pixels that are located at different positions and arranged temporally and then determine luminance signals of the subject pixel. Further, operation formulae that are used in the simplified Y/C separation are not limited to those described above.

Although in the above embodiments prediction taps are formed by pixels as described in connection with FIG. 6, these prediction taps may be formed by other pixels.

Although in the above embodiments the adaptive process and the learning process are executed for each phase of an NTSC signal, they can be executed irrespective of the phases of an NTSC signal. However, more accurate RGB signals and prediction coefficients can be obtained by executing the adaptive process and the learning process for each phase of an NTSC signal.

Although in the above embodiments an NTSC signal is converted into RGB signals (signals of three primary colors), other conversions are also possible. For example, it is possible to convert a signal based upon a PAL method or the like into RGB signal, or to convert an NTSC signal into YUV signals (a luminance signal Y and color difference signals U and V) or YIQ signals. That is, no particular limitation is imposed on the composite signal before conversion and the component signals after conversion.

Although in the above embodiments flags representing magnitude relationships between a predetermined threshold value and difference absolute values between a plurality of luminance signals determined for the subject pixel are used as their correlation values, other physical quantities may be used.

Although the above embodiments are directed to a field-by-field process, other kinds of process are possible, such as a frame-by-frame process.

The invention can also be applied to other picture-handling apparatuses other than a television receiver, for instance, a VTR (video tape recorder), a VDR (video disc recorder), or the like. Further, the invention can be applied to both a moving picture and a still picture.

Although in the above embodiments a Y–I signal, a Y–Q signal, a Y+I signal, and a Y+Q signal are obtained by sampling an NTSC signal, the sampling of an NTSC signal may be performed with any timing as long as signals of the same phase are obtained every four sampling operations. However, in the latter case, it is necessary to use signals of the same phases also in the learning.

The invention can be performed by a computer program used in a general computer as well as hardware.

As described above, in the signal conversion apparatus and the signal conversion method according to the invention, a plurality of luminance signals of a subject pixel are calculated based on a composite signal of the subject pixel and composite signals of pixels that are close to the subject pixel spatially or temporally, and correlations there between are determined. Then, classification is performed for classifying the subject pixel as one of prescribed classes based on the correlations between the plurality of luminance signals, and component signals of the subject pixel are determined by performing operations by using coefficients corresponding to the class of the subject pixel. Therefore, it becomes possible to obtain a high-quality picture of component signals.

In the learning apparatus and the learning method according to the invention, component signals for learning are converted into a composite signal for learning, and a plurality of luminance signals of a subject pixel are calculated based on a composite signal of the subject pixel and composite signals of pixels that are close to the subject pixel spatially or temporally. Then, correlations between the plurality of luminance signals are determined and classification is performed by determining the class of the subject pixel based on the correlations. Operations are then performed for determining, for each of the classes, the coefficients that decrease errors, with respect to the component signals for learning, of component signals that are obtained by performing operations by using the composite signal for learning and the coefficients. Therefore, it becomes possible to obtain coefficients for obtaining a high-quality picture of component signals.

It will thus be seen that the objects set forth above, among those made apparent from the preceding description, are efficiently attained and, since certain changes may be made in carrying out the above method and in the constructions set forth without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall there between.

What is claimed:

1. A method for converting a composite signal into component signals comprising the steps of:
    calculating a number of luminance signals corresponding to a subject pixel based on a composite signal corresponding to the subject pixel and composite signals corresponding to at least one pixel spatially or temporally adjacent to the subject pixel;
    determining a correlation among the number of luminance signals;
    classifying the subject pixel as belonging to one of a predetermined number of classes based upon the determined correlation;
    generating a class information corresponding to at least one group of predictive coefficients based on the classification of the subject pixel; and
    producing component signals for the subject pixel based on the at least one group of predictive coefficients corresponding to the class information and at least one composite signal corresponding to the at least one pixel adjacent to the subject pixel.

2. The method according to claim 1, wherein
    the at least one group of predictive coefficients is read out from a memory based on the class information, the at least one group of predictive coefficients for each of said respective predetermined number of classes being stored in the memory.

3. The method according to claim 2, wherein
    each of the at least one group of predictive coefficients corresponding to each of said plurality of predetermined number of classes includes predictive coefficients for each component signal.

4. The method according to claim 2, wherein
    the at least one group of predictive coefficients corresponding to each of said plurality of predetermined number of classes is stored for each phase of the composite signal.

5. The method according to claim 2, wherein
    each of the at least one group of predictive coefficients corresponding to each of said plurality of predetermined number of classes is generated based on component signals utilized in advance for learning.

6. The method according to claim 1, wherein the component signals are a luminance signal and color difference signals.

7. The method according to claim 1, wherein the component signals are three primary color signals.

8. The method according to claim 1, further comprising the step of
    determining the correlation among the number of luminance signals based on a magnitude relationship between a threshold value and a difference between the number of luminance signals.

9. An apparatus for converting a composite signal into component signals comprising:
    calculating means for calculating a number of luminance signals corresponding to a subject pixel based on a composite signal corresponding to the subject pixel and composite signals corresponding to at least one pixel spatially or temporally adjacent to the subject pixel;
    determination means for determining a correlation among the number of luminance signals;
    classification means for classifying the subject pixel as belonging to one of a predetermined number of classes based upon the determined correlation and for generating a class information corresponding to at least one group of predictive coefficients based on the classification of the subject pixel; and
    producing means for producing component signals for the subject pixel based on the at least one group of predictive coefficients corresponding to the class information and at least one composite signal corresponding to the at least one pixel adjacent to the subject pixel.

10. The apparatus according to claim 9, wherein
    the producing means includes memory for storing the at least one group of predictive coefficients for each of said respective predetermined number of classes, the at least one group of predictive coefficients being read from said memory based on the respective class information.

11. The apparatus according to claim 10, wherein
    each of the at least one group of predictive coefficients corresponding to each of said plurality of predetermined number of classes includes predictive coefficients for each component signal.

12. The apparatus according to claim 10, wherein
    the memory stores the at least one group of predictive coefficients corresponding to each of said plurality of predetermined number of classes for each phase of the composite signal.

13. The apparatus according to claim 10, wherein
    each of the at least one group of predictive coefficients corresponding to each of said plurality of predetermined number of classes is generated based on component signals utilized in advance for learning.

14. The apparatus according to claim 9, wherein
    the component signals are a luminance signal and color difference signals.

15. The apparatus according to claim 9, wherein
    the component signals are three primary color signals.

16. The apparatus according to claim 9, wherein
    said determination means determines the correlation among the number of luminance signals based on a magnitude relationship between a threshold value and a difference between the number of luminance signals.

17. An apparatus for converting a composite signal into component signals comprising:

a signal receiver;

a calculator coupled with said signal receiver and adapted to receive a pixel information therefrom;

a determiner coupled with said calculator and adapted to receive information therefrom;

a classifier coupled with said signal receiver and adapted to receive said pixel information therefrom; and a component signal producer coupled with the classifier and the signal receiver and adapted to receive information therefrom;

whereby the calculator calculates a number of luminance signals corresponding to a subject pixel based on a composite signal corresponding to the subject pixel received from the signal receiver and composite signals received from the signal receiver corresponding to at least one pixel spatially or temporally adjacent to the subject pixel, the determiner determines a correlation among the number of luminance signals based upon information received from the calculator and the classifier classifies the subject pixel received from the signal generator as belonging to one of a predetermined number of classes based upon the determined correlation by the determiner and generates a class information corresponding to at least one group of predictive coefficients based on the classification of the subject pixel; and whereby the component signal producer produces component signals for the subject pixel based on the at least one group of predictive coefficients corresponding to the class information received from the class information generator and at least one composite signal corresponding to the at least one pixel adjacent to the subject pixel received from the signal receiver.

18. The apparatus according to claim 17, further comprising:

a memory coupled with the classifier;

whereby the at least one group of predictive coefficients for each of said respective predetermined number of classes being stored in the memory and being read from the memory based on the class information.

19. The apparatus according to claim 18, wherein each of the at least one group of predictive coefficients corresponding to each of said plurality of predetermined number of classes includes predictive coefficients for each component signal.

20. The apparatus according to claim 18, wherein the memory stores the at least one group of predictive coefficients corresponding to each of said plurality of predetermined number of classes for each phase of the composite signal.

21. The apparatus according to claim 18, wherein each of the at least one group of predictive coefficients corresponding to each of said plurality of predetermined number of classes is generated based on component signals utilized in advance for learning.

22. The apparatus according to claim 17, wherein the component signals are a luminance signal and color difference signals.

23. The apparatus according to claim 17, wherein the component signals are three primary color signals.

24. The apparatus according to claim 17, wherein said determiner determines the correlation among the number of luminance signals based on a magnitude relationship between a threshold value and a difference between the number of luminance signals.

25. An apparatus for converting a composite signal into component signals, comprising:

separating means for separating a number of luminance signals, corresponding to a subject pixel, from a composite signal corresponding to the subject pixel and composite signals corresponding to at least one pixel spatially or temporally adjacent to the subject pixel;

classification means for classifying the subject pixel as belonging to one of a predetermined number of classes based upon the luminance signals separated at said separating means and for generating a class information corresponding to at least one group of predictive coefficients based on the classification of the subject pixel; and producing means for producing component signals for the subject pixel based on the at least one group of predictive coefficients corresponding to the class information and at least one composite signal corresponding to the at least one pixel adjacent to the subject pixel.

26. A method for converting a composite signal into component signals, comprising the steps of:

separating a number of luminance signals, corresponding to a subject pixel, from a composite signal corresponding to the subject pixel and composite signals corresponding to at least one pixel spatially or temporally adjacent to the subject pixel;

classifying the subject pixel as belonging to one of a predetermined number of classes based upon the separated luminance signals;

generating a class information corresponding to at least one group of predictive coefficients based upon the classification of the subject pixel; and producing component signals for the subject pixel based upon the at least one group of predictive coefficients corresponding to the class information and at least one composite signal corresponding to the at least one pixel adjacent to the subject pixel.

* * * * *